United States Patent [19]

Deeg et al.

[11] 4,073,579

[45] Feb. 14, 1978

[54] OPHTHALMIC LENS WITH LOCALLY VARIABLE INDEX OF REFRACTION AND METHOD OF MAKING SAME

[75] Inventors: Emil W. Deeg, Woodstock, Conn.; David A. Krohn, Southbridge, Mass.

[73] Assignee: American Optical Corporation, Southbridge, Mass.

[21] Appl. No.: 694,428

[22] Filed: June 9, 1976

[51] Int. Cl.² ............... G02B 27/10; C03C 15/00; C03C 17/00; C03C 19/00
[52] U.S. Cl. .................... 351/169; 65/30 E; 65/30 R; 65/31; 65/37; 65/38; 65/60 D; 65/60 R; 65/61
[58] Field of Search ............ 65/31, 17, 30 E, 30 R, 65/61, 37, 38, 60 D, 60 R; 351/169

[56] References Cited
U.S. PATENT DOCUMENTS

| | | | |
|---|---|---|---|
| 901,659 | 10/1908 | Stevens | 65/37 |
| 1,483,509 | 2/1924 | Bugbee | 65/18 X |
| 1,630,724 | 5/1927 | Tillyer | 65/37 |
| 1,865,691 | 7/1932 | Hill | 65/37 |
| 2,336,227 | 12/1943 | Dalton | 65/31 |
| 2,355,746 | 8/1944 | Nurdberg et al. | 65/31 |
| 3,486,808 | 12/1969 | Hamblen | 65/30 E |
| 3,542,535 | 11/1970 | Hensler et al. | 65/37 X |
| 3,650,598 | 3/1972 | Kitayo et al. | 65/31 X |
| 3,802,761 | 4/1974 | Giallorenzi et al. | 65/30 E |
| 3,857,689 | 12/1974 | Kolzumi et al. | 65/30 E |
| 3,938,974 | 2/1976 | Macedo et al. | 65/31 X |

FOREIGN PATENT DOCUMENTS 189,988   3/1965   U.S.S.R. ................ 65/31

Primary Examiner—S. Leon Bashore
Assistant Examiner—Frank W. Miga
Attorney, Agent, or Firm—Howard R. Berkenstock

[57] ABSTRACT

Ophthalmic lenses with locally variable indices of refraction produced from microporous glass bodies diffused with inorganic salts and rendered transparent by heat treatment. Local variations in refractive index result from differences in concentrations of the salts produced by controlled diffusion and/or selective leaching after impregnation of the porous bodies.

8 Claims, 11 Drawing Figures

U.S. Patent  Feb. 14, 1978  4,073,579
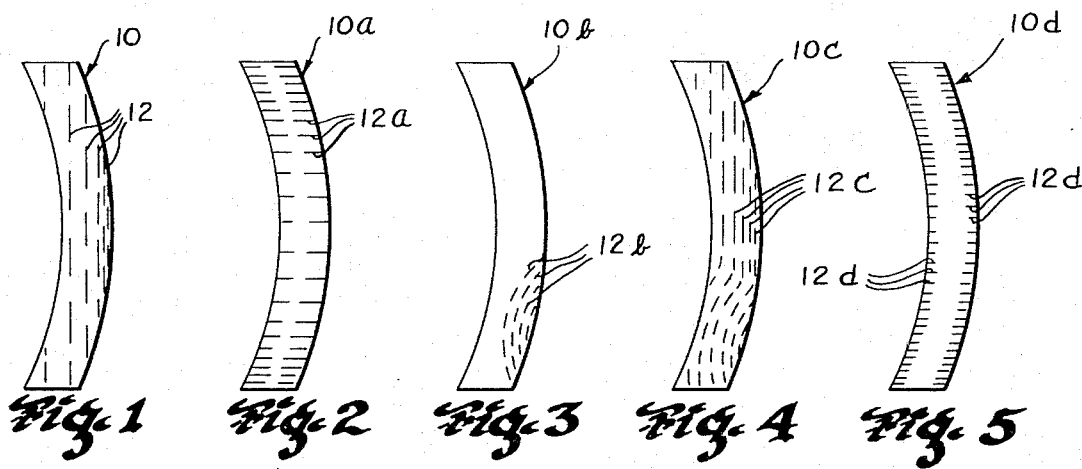
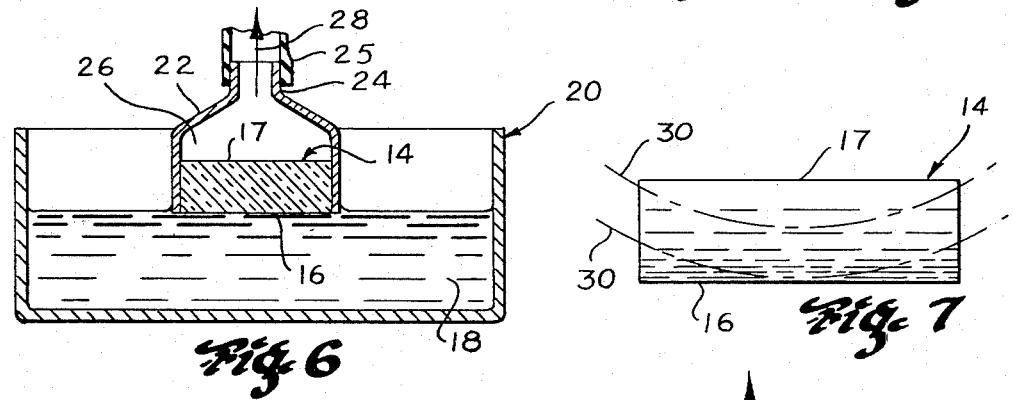
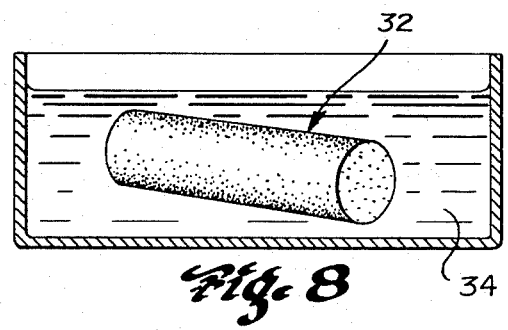
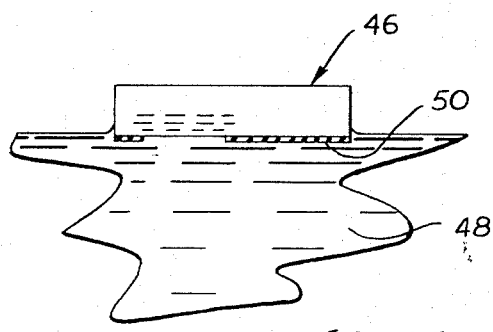

OPHTHALMIC LENS WITH LOCALLY VARIABLE INDEX OF REFRACTION AND METHOD OF MAKING SAME

BACKGROUND OF THE INVENTION

1. Field of the Invention

Ophthalmic lenses and more particularly lenses having controlled locally variable indices of refraction and/or high strength surface compression.

2. Discussion of the Prior Art

Lenses having locally variable indices of refraction are customarily fused multifocal lenses. These lenses show local variations of refractive index with discrete boundary surfaces between adjacent areas of different indices. As an example, a fused multifocal lens consisting of a major portion of refractive index 1.523 and at least one other segment portion having a higher refractive index fused onto a small portion of a surface of the major portion, the transition from the major to the higher index segment portion is conventionally produced by a fusion zone which causes a sharp, discontinuous change of the refractive index.

Ophthalmic lens designers have developed techniques for accomplishing multifocal effects and/or marginal corrections in lenses with aspheric surface design and wherewith the sharp discontinuous changes in refractive index can be avoided. The processes used, however, are difficult, cumbersome and costly mainly due to the need for producing the aspheric surfaces by mechanical means. Examples of aspheric lens surface designing may be found in U.S. Pat. Nos. 1,351,785; 2,869,422; 3,169,247; and 3,687,528.

Methods for producing locally variable refractive indices in glass bodies have also been developed with a view to overcoming the drawbacks of fused multifocals and/or problems encountered in the manufacture of aspheric surfaces. These methods, examples of which may be found in U.S. Pat. Nos. 3,873,408; 3,729,253; 3,486,808; and 3,212,401, utilize ion exchange processing to produce local alteration of refractive indices of the glass pieces. A major disadvantage of this processing is the low rate of production, i.e., taking several days of treatment to produce refractive index variations of significant thicknesses in lens materials. The limited number of ions available for utilization of ion exchange processing is still another disadvantage. An object of the present invention is to overcome the aforementioned and related drawbacks of prior art methods of accomplishing locally variable indices of refraction in ophthalmic lenses and to provide improved ophthalmic lenses together with greater ease, economy and dependability in their processing.

Other objects and advantages of the invention will become apparent from the following description.

SUMMARY OF THE INVENTION

According to the present invention large portions of glass bodies, i.e., lens blanks, are quickly, easily and economically provided with variations of refractive index by utilizing the capillary forces of open pores of microporous glass.

A microporous lens blank of phase-separated and leached glass is subjected to a solution of an inorganic salt or salts which can be permitted to penetrate only into preselected portions of the body and/or to controlled depths or completely fill the porous structure of the body. The solvent is then evaporated by heating the blank sufficiently to cause the originally dissolved salt to precipitate inside the pores. At this point, the blank may be subjected to a final treatment at elevated temperatures to close the pores and render the blank transparent. In cases where amounts of salts penetration according to desired variations in refractive index have been undertaken, the final heat treatment forms corresponding local variations of its composition and thus desired variations in refractive index.

In the alternative where complete absorption of the solution of a salt is effected, final heat treatment is preceded by selective leaching of the blank, e.g., with a pure solvent, to produce desired local variations of concentration of the absorbed salts according to variations desired of refractive index. It is also considered to expose the partially leached body to at least one other solution different in composition from the solution used in the first exposure, thus providing for even wider variations of the anticipated index changes. The final heat treatment at elevated temperatures then produces the aforementioned local variations in composition of the blank with corresponding variations in its refractive index.

The heat-treated blank resulting from either the locally imbibed or the completely filled, dried and then leached procedure is lastly conventionally surface ground, polished and edged for use.

Ophthalmic lenses prepared as briefly outlined above can be of the single vision or multifocal types. In the latter case, distance viewing, reading and/or intermediate viewing portions may be provided. Progressive power changes between viewing portions or continuously across a lens can be readily effected and high power single vision lenses with essentially spherical surfaces but with optical performances normally requiring aspheric surfaces can also be produced according to the invention.

Furthermore, when using microporous glass bodies consisting essentially of $SiO_2$, lenses resulting from the process of the invention can be expected to have high surface compression adjacent to areas of composition change produced by the introduction of inorganic compounds. This, accordingly, lends strength to the lenses increasing their resistance to impact when the compression is in the surface of a lens.

Details of the invention will become more readily apparent from the following description when taken in conjunction with the accompanying drawings.

IN THE DRAWINGS

FIGS. 1–5 are illustration, in cross-section, of some of various forms of ophthalmic lenses which can be produced according to the invention, cross-section lines having been omitted for clarity of illustration of principles of the invention and dash lines substituted to illustrate directions of constant index of refraction contemplated by the invention;

FIG. 6 is a diagrammatic illustration of exemplary means and method for effecting steps toward accomplishing a gradation of refractive index of the type depicted in FIG. 1;

FIG. 7 is a diagrammatic illustration of further steps which may be taken toward completion of a lens of the type depicted in FIG. 1;

FIG. 8 illustrates a procedure useful in affording lenses with refractive index gradients of the general form depicted in FIG. 2;

FIG. 9 illustrates a technique useful in producing a refractive index gradation of the general form depicted in FIG. 3.;

FIG. 11 illustrates another technique for producing localized refractive index gradation in a lens blank; and FIG. 10 is an illustration of still another procedure which may be employed more particularly as a step toward producing a refractive index gradation of the general type depicted in FIG. 4.

DESCRIPTION OF THE PREFERRED EMBODIMENTS

Referring more particularly to FIGS. 1-5 wherein, in each case, there is illustrated the cross-sectional configuration of a lens. Dash lines indicate the directions of constant refractive index which can be afforded according to the invention and the spacing of these lines is intended to diagrammatically represent refractive index variations or gradations.

In lens 10 (FIG. 1) for example, refractive index along any one of lines 12 is substantially constant in directions from edge-to-edge or radially cross the lens. The gradation of refractive index, however, is in directions from front (convex side) to back (concave side) or vice versa. As it will become apparent hereinafter, the refractive index gradation may be such that it will increase in directions either from front-to-back of the lens, or the reverse.

In lens 10a (FIG. 2), the refractive index is caused to remain substantially constant along each of lines 12a, i.e., in directions from front-to-back or parallel to the axis of the lens, while being graduated in directions radially from center-to-edge. Again, the refractive index gradation may be caused to either increase or decrease in the radial direction from center-to-edge.

In either of the situations of the FIGS. 1 and 2 embodiments of the invention, the gradations of refractive index can be utilized in conjunction with simple spherical front and rear surface curvatures to accomplish results having heretofore required difficult and expensive-to-produce compound and aspheric surfaces. Those interested in details of application of variable refractive index in the designing of optical lenses may refer to U.S. Pat. No. 3,729,253.

Referring more particularly to lens 10b (FIG. 3), dash lines 12b depict a localized difference in refractive index. This form of refractive index gradation can be used to produce multifocal lenses. With the main body portion of lens 10b having a uniform index of refraction and the portion thereof containing dash lines 12b being of a higher refractive index, the uppermost portion of lens 10b may be used for distance viewing while the lowermost portion, through the area thereof containing lines 12b, can provide higher power or greater magnification for reading purposes. It should be understood, however, that the portion of lens 10b having lines 12b can be provided with a lower refractive index than the larger main body portion of the lens if such an arrangement may be desired to satisfy particular requirements.

In FIG. 4, lens 10c has a gradation of refractive index which combines the features of lens 10 and 10b in that the uppermost portion of lens 10c has an index direction and gradient similar to that of lens 10 while the lowermost portion of lens 10c has an index direction and gradation more like lens 10b. This and/or similar arrangements of refractive index directions and gradations can be employed to produce a lens having a generally progressively changing effective power, i.e., from top to bottom. Also, marginal corrections can be afforded without the need for conventional complicated and difficult-to-produce compound or aspheric surface curvatures.

In FIG. 5, there is illustrated lens 10d wherein dash lines 12b illustrate a surface differential in refractive index which can be provided for purposes of affording lens 10 with a surface compression and thus a high resistance to abrasion and/or impact damage.

Lenses of the types illustrated in FIGS. 1-5 and/or variations thereof are produced, according to the invention, by utilizing, as a starting material or lens blank, a microporous glass body. A preferred form of such a glass body is a completely leached phase-separated glass. Glass compositions in a certain region of the ternary system—$R_2O$—$B_2O_3$—$SiO_2$—will, on the proper heat treatment, separate into two phases one of which is very rich in silica (the insoluble phase) and the other very rich in alkali and boric oxide (the soluble phase) which can be leached out of and away from the insoluble phase leaving the latter as a rigid microporous structure. While these microporous structures are generally opaque due to the light scattering that takes place in the gaseous inclusions and/or against the surfaces of the pores, treatment of the microporous glass at elevated temperatures can close the pores and transfer the microporous structure into a transparent body for use as an ophthalmic lens. Those interested in details of the manufacture of phase-separated microporous glasses may refer to U.S. Pat. No. 2,106,744.

Before final heat treatment, the open pore structure can readily absorb solutions of inorganic salts by capillary action and the salts can be precipitated therein by evaporation of the solvent.

The present invention contemplates the use of any salt or salts that can increase the refractive index of the lens body. Salts of lead, rare earth or mixtures of alkali salts and lead and/or rare earth salts can be used to provide different index variations in ophthalmic lenses produced according to this invention. It is also contemplated that mixtures of alkaline earth salts with the aforementioned salts and/or any alkaline earth salts alone may be used. Tinted lenses may also be made according to the invention by using or adding colored inorganic salts, e.g., such of Fe, Nd, Cr, Au, Mn, Co, or Cu.

In accomplishing the constant index of refraction directions and gradations illustrated by dash lines in FIGS. 1-5, the selected salt or salts in solution can be permitted to penetrate only into preselected portions of a particular glass body or the porous structure of the glass body can be completely filled with the solution of salts. In either case, drying at room temperature or with a drying cycle accelerated by mild heating, e.g., from 40° to 60° C, will precipitate the salts inside the pores in concentrations and locations according to the exposure given the glass body to the salt solution.

Thereafter, subjecting the glass body to a temperature of from approximately 900° to 1000° C for approximately 2 hours will render the glass body transparent and adaptable to use as an ophthalmic lens blank or lens. Higher temperatures may be used provided the article is supported on a form to prevent distortion in shape. Local variations of salts cause correspondingly localized variations in composition of the glass body which, in turn, affords the desired variations in its refractive index.

In the situation where the particular porous glass body may have been permitted to become completely uniformly filled with the preselected salt solution and dried, localized and/or gradations of the precipitated salts is effected by exposing the glass body or a preselected portion thereof to a pure solvent for the salt. Following selective leaching by the solvent, the glass body is again dried and heat treated at an elevated temperature to produce the transparency required for use as an ophthalmic lens.

In FIGS. 6–11, there are illustrated various forms of equipment and method by means of which lenses of the types illustrated in FIGS. 1–5 and others not shown may be produced. It should be understood, however, that various combinations and/or modifications of these apparatuses and/or method may be made to suit particular requirements.

Referring more particularly to FIGS. 6 and 7 which illustrate a technique applicable to the manufacture of an ophthalmic lens of the type depicted in FIG. 1, a flat body 14 of microporous glass, e.g., $SiO_2$ glass, of a thickness and diametral dimension sufficient for subsequently cutting into the shape and size desired of the ultimate lens 10 (FIG. 1) is treated by exposing one of its surfaces 16 to a solution 18 of a preselected inorganic salt, e.g., an aqueous solution of sodium nitrate in a container 20.

Fitted about the edge of glass body 14 is a holder 22 which is necked down at 24 for receiving a vacuum line 25 which, when connected to a vacuum pump of any conventional design (not shown) affords means for evacuating air and gases from space 26 in the direction of arrow 28. This accelerates the forces of capillary action in filling the pores of microporous body 14. By control of the time of exposure of side 16 to solution 18 and the extent of vacuum in space 26 the depth of penetration and amount of solution 18 can be regulated according to the refractive index gradation desired in an end product lens such as lens 10 of FIG. 1.

Glass body 14 may then be removed from solution 18 and dried at room temperature and/or heated to between 40° and 60° C to cause precipitation of the inorganic salts in situ. Thereafter, heating of the body 14 under elevated temperature in the order of from 900° to 1000° C will render it transparent with variations in its composition resulting from inclusions of the precipitated salts causing corresponding local variations in refractive index. A slight volumetric shrinkage will take place due to closing of the pores.

Following the heat treatment and subsequent cooling to room temperature, glass body 14 may then be cut and/or ground and polished to the shape, size and surface finish desired of an ophthalmic lens to be formed therefrom. Dot-dash lines 30 in FIG. 7 are exemplary of finishing lines to which body 14 may be worked should it be desired to form a lens of the type depicted in FIG. 1.

Another procedure which may be followed to produce lenses of the type illustrated in FIG. 1 with the apparatus of FIG. 6 comprises allowing microporous glass body 14 to remain in contact with solution 18 for a period of time sufficient to completely and uniformly fill all pores therein. Evacuation of space 26 in holder 22 may be used to expedite this operation. Drying of the solvent component of solution 18 in pores of body 14 at room temperature and/or with applied heat is next undertaken to cause precipitation of the inorganic salt component of solution 18 within the pores of body 14 uniformly therethrough.

Localized variations or gradations of the thus precipitated salt or salts is next accomplished by exposing either side 16 or opposite side 17 of the body 14 to a pure solvent for the precipitated salts. Capillary action and/or the assistance of a vacuum will cause a leaching away of portions of these salts according to the time of exposure of body 14 to the pure solvent and force of vacuum applied. It will be appreciated that the exact system and apparatus of FIG. 6 may be incorporated to perform this last-mentioned operation simply by substituting the pure solvent for solution 18.

After leaching, drying and final heat treatment at an elevated temperature will render the body 14 transparent and useful as an ophthalmic lens blank. As depicted in FIG. 7, body 14 may be surfaced along lines 30 to complete the final configuration of lens.

In FIG. 8, there is illustrated a technique which may be used according to the invention to produce ophthalmic lenses of the type depicted in FIG. 2. Here, a rod 32 of microporous glass is immersed in a solution 34 of an inorganic salt, e.g., the same solution as solution 18 of FIG. 6.

Penetration of solution 34 into the pores of rod 32 will take place radially and is terminated by removal of rod 32 when a desired depth of penetration has occurred. In the first-mentioned case of partial penetration of solution 34, drying and final heat treatment under an elevated temperature sufficient to render the rod transparent would normally be effected. In the latter case of complete and uniform penetration of solution 34, drying, leaching with pure solvent, and again drying of the rod 32 would be effected prior to final heat treatment. In either case, the finally treated transparent rod would be sliced transaxially into segments of thicknesses each suitable for grinding and polishing to a desired finished lens shape. It should be apparent that in this case, the aforementioned radial penetration and/or radial leaching will produce the index gradation from center outwardly or vice versa which has been illustrated in FIG. 2 and wherein directions of constant refractive index are parallel to the lens axis.

In FIG. 9, it can be seen that a body 36 of microporous glass having one of its sides 38 placed in contact with a solution 40 of an inorganic salt or salts can be locally impregnated with the salt solution substantially according to dash lines 42 by drawing solution 40 thereinto with vacuum chamber 44. Alternatively, microporous body 36 may be completely and uniformly impregnated with a solution 18 in the manner described in connection with body 14 and dried to cause precipitation of the salt therewithin. Then, by performing the operation illustrated in FIG. 9 and just described but with a pure solvent for the salt in place of solution 40, a leaching operation will produce the illustrated localized gradation of salts within the body 36. Final heat treatment at elevated temperatures for effecting transparency and cutting and/or grinding and surface polishing operations will produce a final lens product of a type depicted in FIG. 3.

A modification of this last-mentioned system of FIG. 9 has been illustrated in FIG. 10. Therein, it can be seen that localized impregnation of a glass body 46 with a salt solution 48 can be effected by masking surface areas of body 46 adjacent to which it is desired to not change the refractive index of the body. A mask 50 of wax, paint or other suitable impermeable material may be used.

In FIG. 11, it can be seen that an arrangement of dual vacuum chambers 52 and 54 may be applied to one surface 56 of a microporous glass body 58 and wherewith by application of differential evacuating forces within chambers 52 and 54 a nonuniform impregnation of glass body 58 may be effected substantially as illustrated with dash lines 60. It should be understood that the illustrated liquid 62 in FIG. 11 may embody either a solution of an inorganic salt or a pure solvent for a salt having been previously completely and uniformly imbibed by glass body 58. It should be apparent that the already described alternatives of accomplishing refractive index gradient with or without a leaching operation is applicable to the system of FIG. 11.

Localized impregnation of a microporous lens blank can also be accomplished by applying controlled amounts of a salt solution to a particular part of the blank, e.g., with an eyedropper or the like. Similarly, an application of a controlled amount of a leaching medium can be applied to a fully or partially salt-impregnated blank.

Still another form of localized refractive index variation in a lens blank is illustrated in FIG. 5. Therein, the interior portion of the blank is afforded a different refractive index than its exterior. Lens blank 10d may be produced by complete immersion in a solution of an inorganic salt either for a time period sufficient for the solution to penetrate only partially thereinto or fully and uniformly therethrough.

in the former situation, drying of the blank to evaporate the solvent component of the solution and cause the salt to precipitate within the pores followed by a final heat treatment under elevated temperature sufficient to render the blank transparent can complete the lens. Under the latter condition where the lens blank is immersed for a time period sufficient to produce complete and uniform penetration of the salt solution, the step of drying would be followed by leaching the precipitated salt or salts from outer portions of the lens blank. This, of course, can be accomplished by immersing the dried blank into a pure solvent for the salt or salts for a period of time sufficient to obtain a desired depth of leaching. Final drying and heat treatment to render the blank transparent will complete the process.

In a reduction to practice of the present invention, a plate of microporous $SiO_2$ glass of approximately 5 centimeters by 5 centimeters and approximately 0.3 centimeters in thickness was placed in a 6 molar aqueous solution of sodium nitrate so that only one surface contacted the solution. A vacuum was applied to the opposite surface of the plate, e.g., as shown in FIG. 6, and the plate held in this position until its porous structure was completely and uniformly penetrated by the solution. This was accomplished in approximately 5 minutes. The thus impregnated plate was allowed to become completely dry at room temperature causing the sodium nitrate to precipitate inside the pores. Following drying, the plate was submersed in distilled water for approximately 2 minutes thereby leaching substantial amounts of the precipitated sodium nitrate from outermost portions thereof. The plate was again dried at room temperature and then heated to a temperature of approximately 900° C and held thereat for approximately 2 hours to render the structure completely transparent. The plate was next cooled to room temperature and cut through its thickness for purposes of measuring the refractive index thereacross. This measurement indicated that centermost portions of the plate had a refractive index higher by 0.008 than edges of the plate where leaching had taken place. The refractive index changed from center-to-edge with a continuous transition.

The index variation of the above-described reduction to practice is fully adequate for producing an aspheric behavior in a lens by using only spherical surfaces on opposite sides of the plate.

Microporous glass bodies consisting essentially of $SiO_2$ and treated according to the present invention can be expected to have high surface compression in areas of composition change produced by the introduction of organic compounds. Surface compression lends strength to lenses thereby increasing their resistance to scratch, abrasion and/or impact damage.

Those skilled in the art will readily appreciate that there are various other modifications and adaptations of the precise forms of the invention here shown which may suit particular requirements. The foregoing illustrations are not to be interpreted as restrictive of the invention beyond that necessitated by the following claims.

We claim:

1. The method of making an ophthalmic lens having locally variable index of refraction comprising the steps of:

shaping a piece of microporous glass to the configuration desired of a blank from which said lens may be formed, said blank being greater in size than desired of said lens;

placing a side of said blank in contact with a solution of an inorganic salt to cause at least partial filling of a preselected portion of said blank with said solution by capillary forces of open pores of said glass;

removing said blank from said salt solution and causing evaporation of the solvent of said solution from said pores and precipitation of said salt in said preselected portion of said blank;

heating the thus dried blank to a temperature and for a period of time sufficient to close said pores and render said blank transparent with local variations of its composition in said portion containing said precipitated salt, said variations in composition causing corresponding variations in refractive index, and grinding and polishing said heat-treated blank to the meniscus shape, size and surface finish of an ophthalmic lens.

2. The method according to claim 1 wherein said preselected portion of said blank is caused to become completely filled with said solution of said salt and, following said step of causing evaporation of said solvent, said preselected portion of said dried blank is placed in contact with a substantially pure leaching medium for said salt to effect leaching thereof;

said leaching step being terminated by removal of said blank from said leaching medium when resulting localized variations in densities of said precipitated salt substantially correspond to locally variable index of refractive effects desired in said lens.

3. The method according to claim 1 wherein filling of said preselected portion of said blank by capillary forces of open pores in said glass is assisted by application of a partial vacuum to at least a portion of a side of said blank opposite to that placed in contact with said solution.

4. The method according to claim 2 wherein said complete filling of said preselected portion of the blank by capillary forces is assisted by application of a partial vacuum to at least a portion of a side of said blank opposite to that placed in contact with said solution.

5. The method according to claim 1 wherein said solution includes a colored inorganic salt.

6. The method according to claim 2 wherein said solution includes a colored inorganic salt.

7. The method according to claim 2 wherein said blank is completely immersed in said substantially pure leaching medium for the duration of said leaching step.

8. The product of the process of claim 1.